(Model.)
E. HANER.
PLOW.
No. 281,499. Patented July 17, 1883.
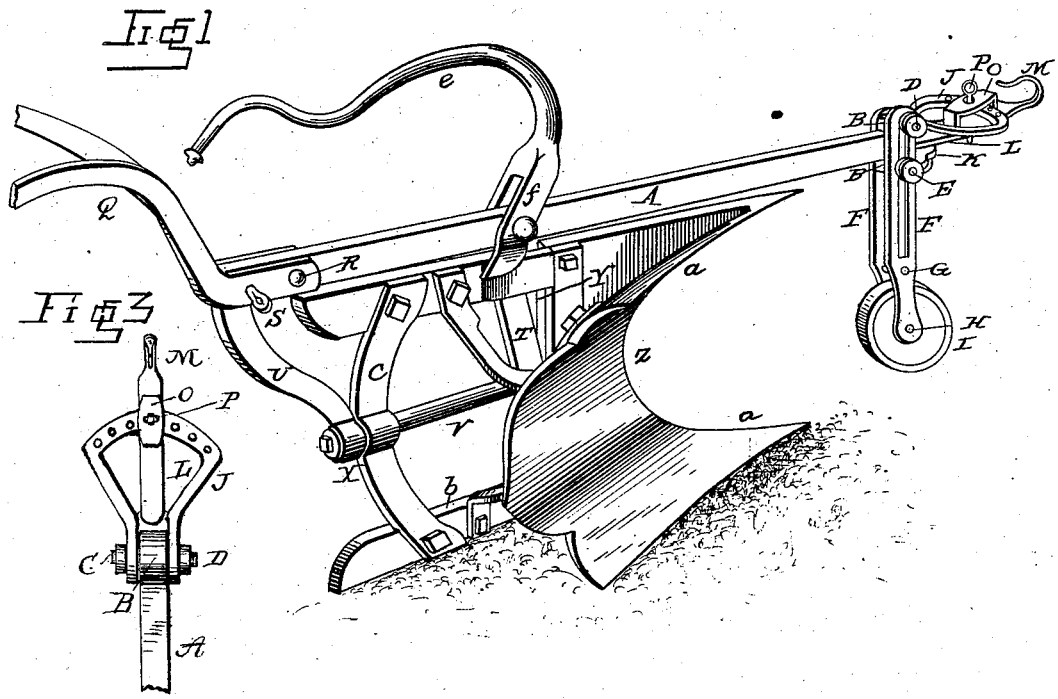
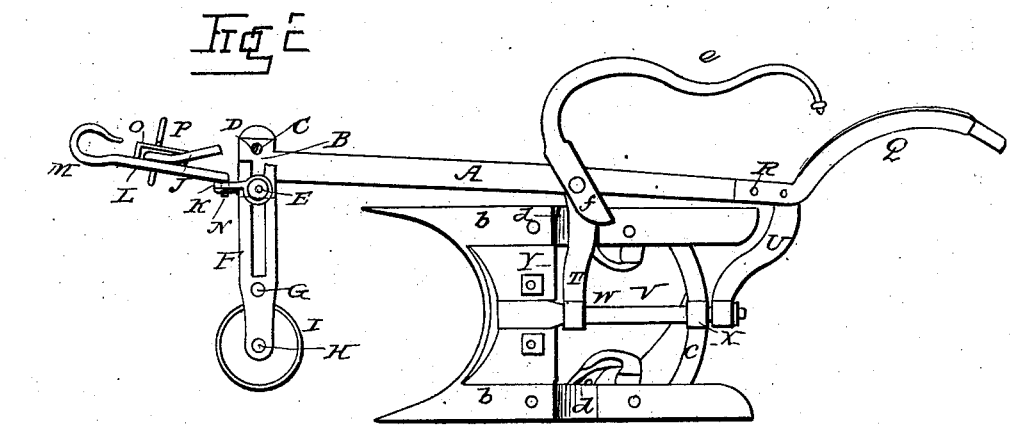
WITNESSES:
Fred. G. Dieterich
Jno. G. Hinkel
Emil Haner
INVENTOR,
By Louis Bagger & Co.
ATTORNEYS

UNITED STATES PATENT OFFICE.

EMIL HANER, OF GENESEO, ILLINOIS.

PLOW.

SPECIFICATION forming part of Letters Patent No. 281,499, dated July 17, 1883.

Application filed March 3, 1883. (Model.)

*To all whom it may concern:*

Be it known that I, EMIL HANER, of Geneseo, in the county of Henry and State of Illinois, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved side-hill plow. Fig. 2 is a side view of the same; and Fig. 3 is a top view of the outer end of the beam and clevis and draft-bar.

Similar letters of reference indicate corresponding parts in all the figures.

My invention has relation to side-hill or turn-wrest plows; and it consists in the detailed construction of parts of the same and their combination, as hereinafter more fully described and claimed.

In the accompanying drawings, the letter A indicates the beam, the front end of which forms a vertical T-head, B, having two perforations, C, at its upper and lower end.

Two bolts, D and E, pass through the said holes, and two slotted bars, F, slide upon the ends of the said bolts, while they are connected at their lower ends by a cross-piece, G, and by a short axle, H, upon which a small disk or wheel, I, is journaled. The rearward-projecting eyed ends of a clevis, J, are fastened to the outer ends of the upper bolt, D, secured thereto by the head of the bolt and a nut upon the other end, and the rearward-projecting eyed ends of a perforated plate, K, are fastened in a similar manner upon the lower bolt, E.

A short bar, L, having a hook, M, in its outer end, to which the draft is applied, and pivoted at its inner downward bent end, N, in the perforated plate K, slides under the clevis J, supported by a bail, O, passing over the clevis; and a bolt, P, passing through holes in the bar L and bail O, serves to adjust the direction of draft by changing it from one hole to another in the clevis-plate. The perforated clevis-plate forms an arc eccentric to the arc described by the perforated bail O when the draft-bar L is moved from one side to the other, and the ends of the same contract, coming nearer to the pivotal point of the draft-bar, which will cause the outer end of the draft-bar to be raised when it is changed from being adjusted near the middle of the clevis to near one end of the same. When it now is desired to adjust the plow to take a wider furrow, the draft-bar and its bail are moved away from the land and secured by the bolt P in one of the outer holes of the clevis; and it is a well-known fact that when the plow is adjusted to take a wider furrow, with the other adjustment of the plow remaining as before, the furrow made will become shallower; but as the draft-bar is raised by the shape of the clevis-plate and by the relative positions of the latter and the draft-bar, the pitch of the plow will be changed at the same time as the draft-bar is adjusted to the side, forcing the plow deeper in the ground in the same proportion as the furrow is made wider, causing the plow to work at the same depth as before. The handles Q are hinged upon a bolt, R, at the rear end of the beam, and secured by a removable pin or bolt, S, passing through holes in the lower ends of the handles and through the beam in the rear of bolt R, so that the handles may be thrown forward when the plow is not used, thus being out of the way, the plow occupying less room.

Two arms or standards, T and U, project downward from the beam, the one, T, from near its middle, and the other, U, from its rear end, and a shaft or round bar, V, turns in eyes W and X in the lower ends of these standards.

To the front end of this shaft is fastened a cross-piece or yoke, Y, to which the mold-board Z of the double-plow body is fastened. This mold-board curves out above and below, serving as mold-board for the two shares *a* and landsides *b* of the double plow. The landsides are fastened at their rear ends to a yoke, *c*, which is fastened at its middle to the shaft V, near the rear standard, so that the plow-body may be turned around to either side of the beam, and recesses *d* in the outer sides of the landsides serve to receive the standard T to enable the landsides and front edge of the plow to stand perfectly vertical. A curved lever, *e*, is pivoted upon the beam near standard T, and its downward-bent bifurcated ends f clamp on both sides of the landside, holding the plow-body from turning, while its curved rear end may be lifted, raising the bifurcated ends and allowing the plow-body to be turned.

Having thus described my invention, I claim and desire to secure by Letters Patent of the United States—

The combination of the perforated clevis-plate J, hinged with its eyed rearward-bent ends upon bolt D in the outer end of the plow-beam, with the draft-bar L, having perforated bail O and bolt P, and pivoted with its inner downward-bent reduced end, N, in the perforated plate K, fastened to the end of the plow-beam below bolt D, the curved perforated clevis-plate being eccentric to the arc described by bail O, as and for the purpose shown and set forth.

In testimony that I claim the foregoing as my own I have hereunto affixed my signature in presence of two witnesses.

EMIL HANER.

Witnesses:
UZILEL F. CLARK,
JOHN KIBLEN.